United States Patent
Gerber et al.

(10) Patent No.: US 6,438,131 B1
(45) Date of Patent: Aug. 20, 2002

(54) LOW-OVERHEAD SERVICE SPECIFIC CONVERGENCE LAYER FOR VOICE AND TELEPHONY OVER PACKET-BASED SYSTEMS

(75) Inventors: Patrick A. Gerber, Hazlet; Christopher B. Moran, Middletown; Richard Szajdecki, Jackson, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/123,860

(22) Filed: Jul. 28, 1998

(51) Int. Cl.[7] .............................................. H04L 12/56
(52) U.S. Cl. ..................................... 370/395; 370/469
(58) Field of Search ................................ 370/466, 467, 370/469, 474, 395, 389, 433, 435; 379/410

(56) References Cited

U.S. PATENT DOCUMENTS

| | | | |
|---|---|---|---|
| 4,864,561 A | * | 9/1989 | Ashenfelter et al. |
| 5,220,565 A | * | 6/1993 | Wilson et al. |
| 5,327,457 A | * | 7/1994 | Leopold ...................... 375/10 |
| 5,598,468 A | | 1/1997 | Ammicht et al. |
| 5,630,016 A | * | 5/1997 | Swaminathan et al. |
| 5,831,981 A | * | 11/1998 | Tanimura et al. ............ 370/395 |
| 5,870,397 A | * | 2/1999 | Chauffour et al. |
| 5,883,893 A | * | 3/1999 | Rumer et al. ................ 370/395 |
| 5,917,828 A | * | 6/1999 | Thompson .................... 370/479 |
| 5,930,265 A | * | 7/1999 | Duault et al. ................ 370/473 |
| 5,940,405 A | * | 8/1999 | Sakuma ........................ 370/468 |
| 5,953,339 A | * | 9/1999 | Baldwin ....................... 370/397 |
| 6,049,530 A | * | 4/2000 | Petersen et al. |
| 6,061,820 A | * | 5/2000 | Nakakita ....................... 714/751 |
| 6,075,798 A | * | 6/2000 | Lyons et al. |

OTHER PUBLICATIONS

"AAL Type 2 Service Specific Convergence Sublayer for Trunking," ITU–Telecommunication Standardization Sector, Draft Recommendation I.366.2, Temporary document 24–E (PLEN), Jun. 1998.

"Voice over Frame Relay Implementation Agreement," Frame Relay Forum Technical Committee Contribution, FRFTC 96–025R2, Sep. 1996.

"Voice Packetization —Packetized Voice Protocols," ITU–CCITT Recommendation G.764, Geneva, 1990.

* cited by examiner

*Primary Examiner*—Douglas Olms
*Assistant Examiner*—Ken Vanderpuye
(74) *Attorney, Agent, or Firm*—Ryan, Mason & Lewis, LLP

(57) ABSTRACT

Information is communicated in an Asynchronous Transfer Mode (ATM) or other packet-based communication system using a service specific convergence layer which associates a holdover indicator with each of a number of packets generated in a voice and telephony service layer. The service specific convergence layer may be a Service Specific Convergence Sublayer (SSCS) of an ATM Adaptation Layer (AAL) Type 2 connection, and the holdover indicator may be a holdover bit in a user-to-user-indication (UUI) field of a Common Part Sublayer (CPS) header of the AAL 2 connection. The holdover indicator may specify, for example, whether a speech detector used for providing silence elimination in the transmitted information is in a holdover mode. The indicator can thus be used by a receiver to determine if a period of silence has begun in the transmitted information, so as to facilitate the generation of comfort noise. The holdover indicators can also be used to provide rate control in a CPS transmitter of an AAL 2 device. For example, the transmitter could drop packets having a holdover indicator of a specified value if a maximum bandwidth of a given transmission connection is exceeded.

22 Claims, 4 Drawing Sheets

LOW-OVERHEAD SERVICE SPECIFIC CONVERGENCE LAYER FOR VOICE AND TELEPHONY OVER PACKET-BASED SYSTEMS

FIELD OF THE INVENTION

The present invention relates generally to asynchronous transfer mode (ATM) networks and other types of packet-based communication systems, and more particularly to techniques for transmitting voice and telephony service information over such systems.

BACKGROUND OF THE INVENTION

An ATM communication system provides high-speed, low-delay switching of voice, data, video and other types of user information traffic. In an ATM system, the user information traffic is separated into fixed-length 53-byte cells. Each ATM cell typically includes a 5-byte header and a 48-byte payload. The header incorporates a virtual channel identifier (VCI) and a virtual path identifier (VPI) associated with the corresponding cell. The VCI and VPI together specify a virtual connection (VC) which is established when a user requests a network connection in the ATM system. Additional details regarding these and other aspects of ATM systems can be found, for example, in the ATM Forum, "ATM User-Network Interface Specification," Version 3.1, September, 1994, and in Martin de Prycker, "Asynchronous Transfer Mode: Solution for Broadband ISDN," Ellis Horwood, New York, 1993, both of which are incorporated by reference herein.

The ATM standard includes a number of ATM Adaptation Layers (AALs), each specifying different types of connections in an ATM system. One such AAL is known as AAL Type 2, or simply AAL 2. AAL 2 includes a Common Part Sublayer (CPS) which communicates with the ATM layer, and a Service Specific Convergence Sublayer (SSCS) that operates between the CPS and a communication service layer. The purpose of the SSCS is generally to convey narrowband voice and telephony service information, such as voice, voiceband data, or circuit mode data, associated with various voice and telephony communication services. The SSCS specifies packet formats and procedures to encode different call-related data streams for bandwidth-efficient transport by AAL 2. The SSCS accommodates known techniques of low rate audio encoding, silence compression, and facsimile modulation/demodulation. The CPS provides multiplexing functions which allow many calls to be sent over a single ATM connection. The single ATM connection therefore acts as a trunk group for transmission between two points of access. Additional details regarding AAL 2 and the SSCS can be found in, for example, "AAL Type 2 Service Specific Convergence Sublayer for Trunking," ITU—Telecommunication Standardization Sector, Draft Recommendation 1.366.2, Temporary Document 24-E (PLEN), June 1998, which is incorporated by reference herein.

A significant problem with the existing SSCS in AAL 2, and with similar mechanisms in other packet-based communication systems, is the failure to provide efficient, low-overhead support for a variety of voice and telephony functions, including silence elimination, comfort noise generation and rate control.

SUMMARY OF THE INVENTION

The invention in an illustrative embodiment provides a low-overhead ATM Adaptation Layer 2 (AAL 2) Service Specific Convergence Sublayer (SSCS) for providing Voice and Telephony over ATM (VTOA). An SSCS in accordance with the invention provides the ability to support the delineation of silence intervals, e.g., for silence elimination, as well as other voice and telephony functionality, using a minimal number of bits.

In the illustrative embodiment, an ATM AAL 2 SSCS transmitter associates a holdover indicator with each of a number of packets generated in a corresponding voice and telephony service layer. The holdover indicator may be a holdover bit in a User-to-User-Indication (UUI) field of a Common Part Sublayer (CPS) header of the corresponding AAL 2 connection. The holdover indicator may specify, for example, whether a speech detector used for providing silence elimination in the transmitted information is in a holdover mode. The indicator can thus be used by an SSCS receiver to determine if a period of silence has begun in the transmitted information, so as to facilitate the generation of comfort noise by the corresponding voice and telephony service layer. The holdover indicators can also be used to provide rate control in an AAL 2 CPS transmitter. For example, the CPS transmitter could drop packets having a holdover indicator of a specified value if a maximum bandwidth of a given transmission connection is exceeded. In other words, the CPS transmitter could use the holdover indicator to provide transmission priority to packets containing speech or other specified types of audio information.

Although the illustrative embodiment is directed to the transmission of voice and telephony information over an ATM connection using AAL 2, the invention can also be implemented in other types of packet-based communication systems including, for example, Frame Relay systems and Voice-over-IP systems. In addition, the invention can be applied to other types of audio information. These and other features and advantages of the present invention will become more apparent from the accompanying drawings and the following detailed description.

DETAILED DESCRIPTION OF THE INVENTION

The present invention will be illustrated below in conjunction with exemplary ATM processing hardware. It should be understood, however, that the disclosed techniques are suitable for use with a wide variety of other types of packet-based systems including, for example, Frame Relay systems and Voice-over-IP systems. The term "packet" as used herein is intended to include not only ATM cells but also other types of packets used in other packet-based communication systems. Similarly, the term "service specific convergence layer" as used herein is intended to include not only an SSCS in an ATM AAL 2 connection, but other similar communication mechanisms in other packet-based communication systems. The terms "voice and telephony" and "voice and telephony service" as used herein are intended to include, for example, compressed or uncompressed voice or other audio data, facsimile and other types of data transmitted over a voice channel, comfort noise and telephony signaling, as well as other types of voice-related or telephony-related communications. The terms "voice" and "speech" as used herein are intended to include human-generated audio information, machine-generated audio information or combinations of these and other types of audio information. It should be noted that the invention is generally applicable to any type of audio information. The term "comfort noise" as used herein refers generally to audio information which may be generated by a receiver to replace transmitted audio information so as to increase the perceived quality of a given connection.

Figure 1:
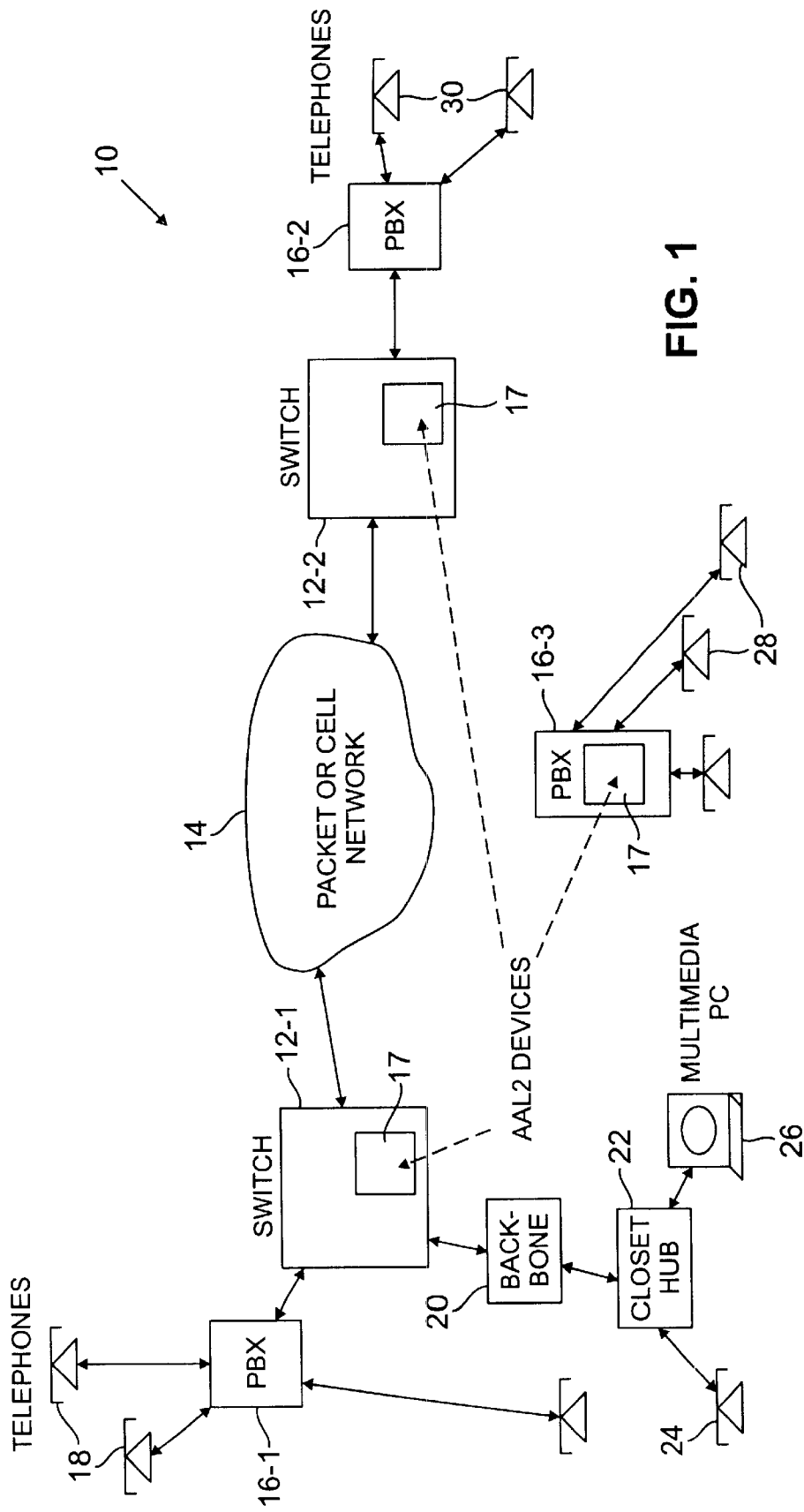
FIG. 1 is a block diagram of an exemplary packet-based communication system including a Service Specific Convergence Sublayer (SSCS) in accordance with the invention.

FIG. 1 shows a packet-based communication system 10 in accordance with the invention. The system 10 includes first and second call processing devices 12-1, 12-2, one or both of which may be an enterprise switch of a business, a carrier edge switch of a service provider, or other like device, e.g., an access concentrator, private branch exchange (PBX), access multiplexer device or Subscriber Loop Carrier (SLC) system. The call processing devices 12-1 and 12-2 are connected to communicate over a packet or cell network 14, which may be an ATM network. The system 10 further includes three PBX switches 16-1, 16-2 and 16-3. The PBX switches 16-1 and 16-1 and 16-2 are connected to call processing devices 12-1 and 12-2, respectively, and PBX 16-3 is connected to network 14. Call processing devices 12-1 and 12-2 and PBX 16-3 are each configured to include an AAL 2 device 17, which may be an SSCS receiver, an SSCS transmitter, or both. The elements 17 may also include other AAL 2 transmission and reception devices, such as, for example, a CPS receiver and a CPS transmitter. The arrangement and configuration of such devices is described in greater detail in, for example, the above-cited ITU Draft Recommendation I1.366.2.

The system 10 supports voice and telephony services using certain conventional devices, such as telephones and computers. For example, the PBX switch 16-1 is connected to telephones 18. The call processing device 12-1 is connected via a backbone 20 to a closet hub 22 which in turn provides connection to a telephone 24 and a multimedia personal computer (PC) 26. The PBX switch 16-3 is connected to telephones 28, and the PBX switch 16-2 connected to call processing device 12-2 is in turn connected to telephones 30. The conventional aspects of the operation of these devices are well understood in the art and therefore not described in detail herein.

The AAL 2 devices 17 are used to communicate voice and telephony information via, e.g., an AAL 2 connection established through the network 14. The call processing devices 12-1 and 12-2 and the PBX 16-3 may each represent different geographic locations in system 10, with all inter-location voice and telephony traffic transported by way of the AAL 2 devices 17 and the network 14. Of course, numerous alternative configurations are possible for system 10, e.g., using elements other than those shown in FIG. 1, and it should be understood that the invention is not restricted to use with any particular system configuration.

Figure 2:
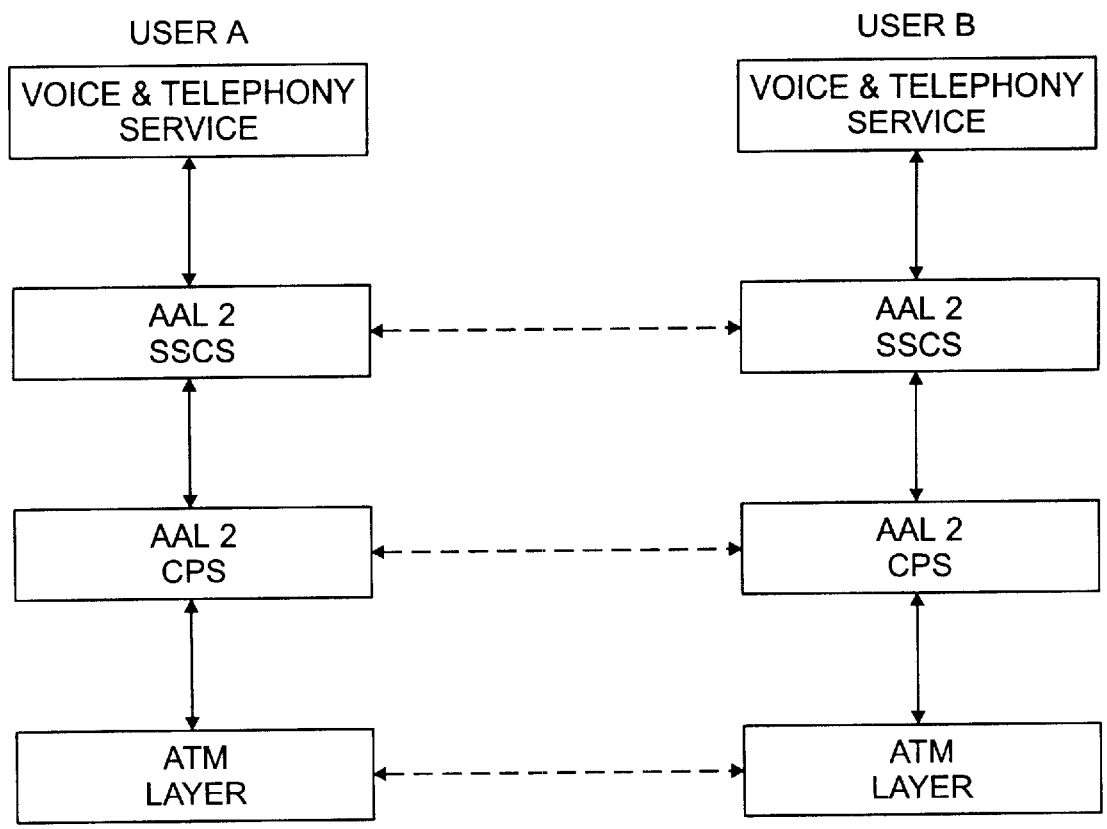
FIG. 2 illustrates the relationship between voice and telephony service, SSCS, CPS and ATM layers in an exemplary AAL 2 connection.

FIG. 2 illustrates the relationship between voice and telephony service layers, SSCS, Common Part Sublayer (CPS) and ATM layers in the system of FIG. 1, for providing voice and telephony services between a given pair of users, e.g., a user A and a user B, of the system 10. The SSCS provides a convergence service to multiple voice and telephony services, e.g., provides a compressed packet voice channel for use by such services. For example, the SSCS takes packets generated by a voice and telephony service, e.g., the voice and telephony service of user A, and encapsulates the packets within one or more SSCS packets. The SSCS passes the resulting SSCS packets onto the next AAL 2 layer, i.e., the CPS. The CPS maintains a channel identifier utilizing a pre-pended header field, and also is responsible for Segmentation and Reassembly (SAR) of CPS packets, i.e., segmentation of CPS packets into ATM cells for delivery to the ATM layer, and reassembly of ATM cells received from the ATM layer into CPS packets. FIG. 2 may also be viewed as illustrating a system providing AAL 2 communication services between user A and user B, with each of thy boxes corresponding to a communication device, e.g., a receiver, a transmitter or both, associated with the corresponding layer.

Figure 3:
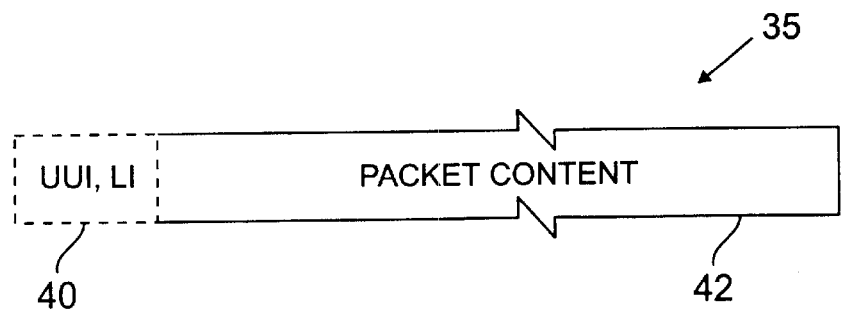
FIG. 3 shows an exemplary AAL 2 SSCS packet including corresponding UUI and LI fields.

FIG. 3 shows an exemplary SSCS packet 35. The SSCS packet 35 is known as a Type 1 Unprotected SSCS packet. The portion 40 of the packet 35 shown in dashed outline includes a User-to-User Indication (UUI) field and a Length Indicator (LI) field from the header of the corresponding CPS packet. The SSCS makes explicit use of the CPS UUI field and implicit use of the LI field. Although shown as part of the SSCS packet in FIG. 3 for purposes of illustration, the UUI and LI fields are technically part of the header of the corresponding CPS packet. The SSCS packet further includes a variable-length payload 42 which in this example does not include any protection, i.e., no cyclic redundancy code (CRC). Other types of SSCS packets may include, e.g., header information, message type information and CRCs. Additional details regarding the various layers of FIG. 2 and the different types of SSCS packets may be found in, for example, the above-cited ITU Draft Recommendation I1.366.2.

The present invention provides an improved SSCS suitable for use in performing the voice and telephony communication described in conjunction with FIGS. 1 and 2. The improved SSCS makes use of the above-noted UUI field of the CPS packet header. The SSCS in the illustrative embodiment of the invention supports the needs of voice and telephony transport applications over an ATM network and is intended to be simple and efficient within the existing constraints of the AAL 2 CPS. However, alternative embodiments of the invention may be implemented in a similar manner in other types of packet-based systems. The SSCS in the illustrative embodiment provides support for the following operations: (1) determining coding type, erg., compression algorithm used for voice coding; (2) silence elimination, (3) AAL 2 CPS level transmit rate control; and (4) voice signal depacketization and playout. As previously noted, the SSCS also controls how packets received from the voice and telephony service layer are incorporated into the SSCS payload.

Figure 4:
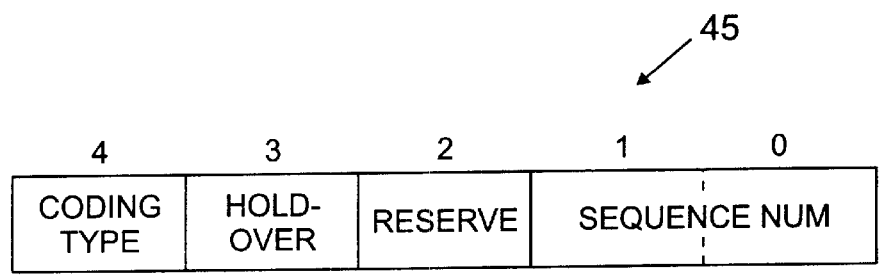
FIG. 4 shows the arrangement of the UUI field associated with the SSCS packet of FIG. 3.

FIG. 4 shows an exemplary UUI field 45 in accordance with the illustrative embodiment of the invention. The UUI field 45 in this embodiment includes five bits, designated bit 4, bit 3, bit 2, bit 1 and bit 0. Bit 4 is a Coding Type bit, and is used in combination with the AAL 2 CPS header LI field to determine the type of voice coding algorithm, e.g., G.711 $\mu$-law, G.726 ADPCM, etc., that is used for the given packet. TABLE 1 below shows an example of the various combinations of Coding Type and Length Indicator that may be supported by an SSCS in accordance with the invention. The exemplary coding types shown in TABLE 1 are well known in the art and will therefore not be further described herein. Bit 2 of the UUI field 45 is a reserve bit which is not used in the illustrative embodiment, but which could be used in other embodiments to provide additional transmission information. Bits 1 and 0 of the UUI field 45 are used to provide a sequence number. The sequence number count is therefore modulo 4, i.e., 00*b*, 01*b*, 10*b*, 11*b*. At the beginning of a given talk spurt, the corresponding first sequence number may always be set to 0. The sequence number may be used, e.g., in an SSCS receiver for depacketization and playout operations.

TABLE 1

| Coding Type Bit | Length Indicator | Coding Type |
| --- | --- | --- |
| 0 | 40 | G.711 µ-law at 64 kbps |
| 0 | 25 | G.727 (5,2) at 40 kbps |
| 0 | 20 | G.727 (4,2) at 32 kbps |
| 0 | 15 | G.727 (3,2) at 24 kbps |
| 0 | 10 | G.727 (2,2) at 16 kbps |
| 1 | 40 | G.711 A-law at 64 kbps |
| 1 | 25 | G.726 at 40 kbps |
| 1 | 20 | G.726 at 32 kbps |
| 1 | 15 | G.726 at 24 kbps |
| 1 | 10 | G.726 at 16 kbps |

Bit 3 of the UUI field 45 is a Holdover (H) bit. This bit is used to support silence elimination and may also be used for AAL 2 CPS rate control. The H bit in the illustrative embodiment indicates indicates that there is a speech detector used for silence elimination is in a holdover mode. That is, H=0 indicates that there is speech information in a given packet, while H=1 indicates that there is no speech information in the packet but the detector is in holdover mode. The operation of such speech detectors is well known in the art and therefore not described in detail herein. The duration of the holdover mode i.e., the holdover time, may be implementation specific but can be administered or provisioned at the system level. The H bit can be used, for example, by an AAL 2 SSCS receiver as a warning that a given talk spurt is about to end, and that the necessary steps should be taken to prepare for upcoming comfort noise fill. Knowing the expected holdover time, the SSCS receiver can, upon seeing the H bit become active, determine the last packet of the talk spurt. The setting of the H bit to provide these functions is done by a corresponding SSCS transmitter.

Figure 5:
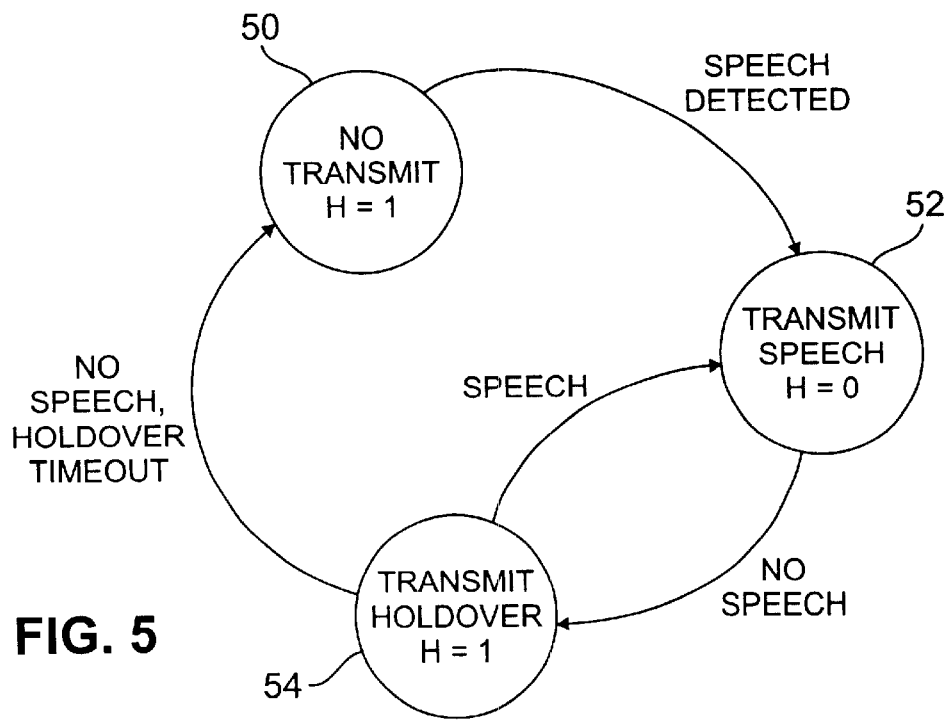
FIGS. 5, 6 and 7 are state diagrams illustrating the operation of an SSCS transmitter, an SSCS receiver, and a CPS transmitter, in accordance with an illustrative embodiment of the invention.

FIG. 5 is a state diagram illustrating the usage of the above-described H bit for a given channel by an SSCS transmitter. The diagram includes three states, a NO TRANSMIT state 50, a TRANSMIT SPEECH state 52, and a TRANSMIT HOLDOVER state 54. The initial state could be either the NO TRANSMIT state 50 or the TRANSMIT SPEECH 52. In the NO TRANSMIT state 50, no speech packets are being transmitted to the CPS, but the transmitted signal is being monitored, e.g., by a speech detector in the voice and telemetry service layer, for the presence of speech. If speech is detected, the SSCS transmitter transitions to the TRANSMIT SPEECH state 52. In this state, packets are sent to the CPS with the H bit equal to zero. The SSCS transmitter remains in this state until a lack of speech is detected, in which case it will transition into the TRANSMIT HOLDOVER state 54. Packets are still being sent to the CPS while the transmitter is in state 54, but these packets are sent with the H bit equal to one. The transmitter remains in the TRANSMIT HOLDOVER state 54 until either the holdover time expires without detection of any additional speech, or speech is detected prior to the holdover time expiration. If the holdover time expires without the detection of any additional speech, the transmitter transitions back to the NO TRANSMIT state 50. If speech is detected prior to the holdover time expiration, the SSCS transmitter transitions back to the TRANSMIT SPEECH state 52.

Figure 6:
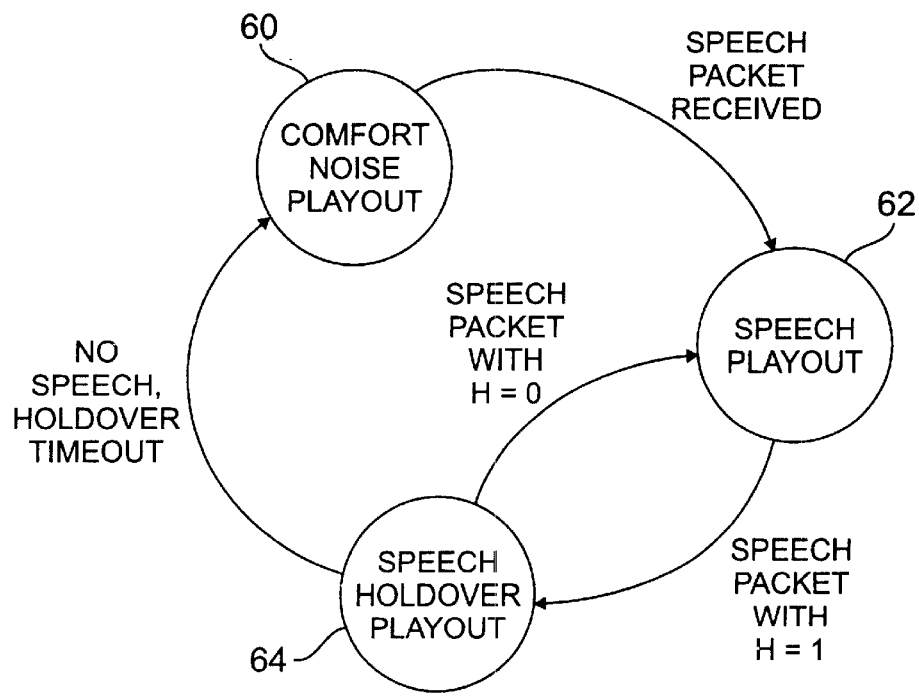

FIG. 6 is a state diagram illustrating the usage of the above-described H bit for a given channel by an SSCS receiver. The diagram includes three states, a COMFORT NOISE PLAYOUT state 60, a SPEECH PLAYOUT state 62, and a SPEECH HOLDOVER PLAYOUT state 64. The initial state is the COMFORT NOISE PLAYOUT state 60. In this state, there are no incoming speech packets, and the SSCS receiver informs the voice and telemetry service layer to playout some comfort noise. Upon reception of a speech packet, the SSCS receiver transitions to the SPEECH PLAYOUT state 62. In this state, the speech contained within the arriving packets is played out by the voice and telephony service. While in the SPEECH PLAYOUT state 62, if a speech packet with the H bit set to one is received, the SSCS receiver transitions to the SPEECH HOLDOVER PLAYOUT state 64. The voice and telephony service is thus fore-warned that an impending silence period is about to start, and can begin preparing for comfort noise, i.e., the transition can be made more seamless with this advance notice. While in the SPEECH HOLDOVER PLAYOUT state 64, if a speech packet with the H bit set to zero is received, the SSCS receiver transitions back to the SPEECH PLAYOUT state 62. If the holdover time expires before a speech packet with H =0 is received, the SSCS receiver transitions to the COMFORT NOISE PLAYOUT state 60. At this point, the voice and telephony service is notified and begins the comfort noise playout.

Another usage of the H bit in accordance with the invention is for AAL 2 CPS level rate control at the CPS transmitter, e.g., when all sources are generating speech simultaneously and the ATM VC cannot support the entire requested bandwidth. As part of this rate control process, during times of congestion the CPS transmitter can, e.g., drop the packets that have an H bit set to one. Generally, a longer holdover period tends to provide a better perceived quality for the voice connection, but in times of congestion, this could be compromised temporarily.

Figure 7:
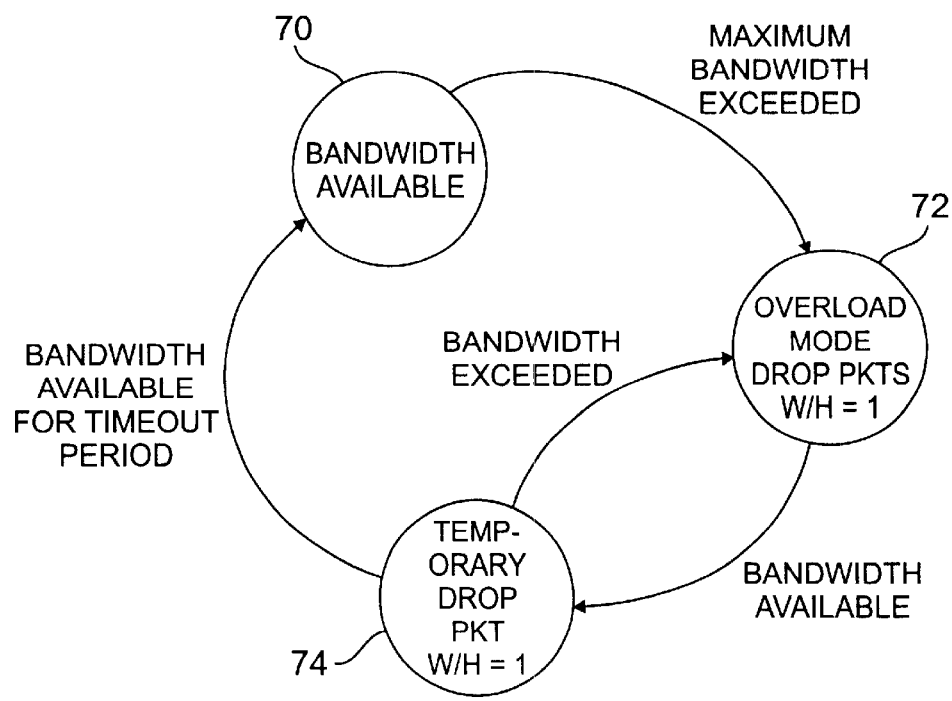

FIG. 7 is a state diagram illustrating the usage of the H bit by a CPS transmitter for providing traffic rate control over a set of channels. The diagram includes three states, a BANDWIDTH AVAILABLE state 70, an OVERLOAD MODE state 72, and a TEMPORARY DROP PACKET state 74. The CPS transmitter is normally in the BANDWIDTH AVAILABLE state 70, in which case all packets from all channels are transmitted to the underlying ATM layer regardless of the value of their H bit. If the maximum bandwidth of the associated VC is exceeded, e.g., because there are too many active talkers in the system, the CPS transmitter transitions to the The above-described embodiments of the invention are intended to be illustrative only. Numerous alternative embodiments within the scope of the following claims will be apparent to those skilled in the art.

What is claimed is:

1. A method for communicating information in a packet-based communication system, the method comprising the steps of:

incorporating the information into packets associated with a service specific convergence layer of a packet-based communication protocol, wherein at least a subset of the packets each include a holdover indicator specifying whether an audio detector used for processing audio information associated with the packet is in a holdover mode; and transmitting the packets in the system, wherein the holdover indicator is used for at least one of generating comfort noise in a receiver of the system and providing rate control in a transmitter of the system.

2. The method of claim 1 wherein the packet-based communication system is an Asynchronous Transfer Mode (ATM) communication system.

3. The method of claim 2 wherein the service specific convergence layer is a Service Specific Convergence Sublayer (SSCS) of an ATM Adaptation Layer (AAL) Type 2 connection.

4. The method of claim 3 wherein the holdover indicator is a holdover bit associated with a user-to-user-indication field of a Common Part Sublayer (CPS) of an ATM Adaptation Layer (AAL) Type 2 connection.

5. The method of claim 1 wherein the holdover indicator specifies whether a speech detector used for providing silence elimination in the transmitted information is in a holdover mode.

6. The method of claim 1 further including the steps of:
receiving the packets in a receiver of the system; and
utilizing the holdover indicators from the packets to determine if a period of silence has begun in the information transmitted in the packets.

7. The method of claim 6 further including the step of directing the playback of comfort noise based on the value of a given one of the holdover indicators.

8. The method of claim 1 further including the step of utilizing the holdover indicators to provide rate control as part of the transmitting step.

9. The method of claim 8 wherein the step of utilizing the holdover indicators to provide rate control further includes the step of dropping at least one of the packets having a holdover indicator of a specified value if a maximum bandwidth of a transmission connection is exceeded.

10. The method of claim 9 wherein the dropping step includes dropping those packets having a holdover indicator which indicates that the corresponding packet does not include speech information.

11. The method of claim 1 wherein at least a subset of the packets include a coding type indicator, wherein the coding type indicator for a given one of the packets is used in conjunction with a length indicator associated with that packet to determine a coding type for audio information in that packet.

12. An apparatus for communicating information in a packet-based communication system, the apparatus comprising:
a first device associated with a service specific convergence layer of a packet-based communication protocol, the first device being operative to incorporate the information into packets associated with the service specific convergence layer, at least a subset of the packets each including a holdover indicator specifying whether an audio detector used for processing audio information associated with the packet is in a holdover mode; and
a second device coupled to the first device and associated with another layer of the packet-based communication protocol, the second device being operative to process the packets for transmission in the system.

13. The apparatus of claim 12 wherein the packet-based communication system is an Asynchronous Transfer Mode (ATM) communication system.

14. The apparatus of claim 13 wherein the service specific convergence layer is a Service Specific Convergence Sublayer (SSCS) of an ATM Adaptation Layer (AAL) Type 2 connection.

15. The apparatus of claim 12 wherein the holdover indicator is a holdover bit associated with a user-to-user-indication field of a Common Part Sublayer (CPS) of an ATM Adaptation Layer (AAL) Type 2 connection.

16. The apparatus of claim 12 wherein the holdover indicator specifies whether a speech detector used for silence elimination in the transmitted information is in a holdover mode.

17. The apparatus of claim 12 wherein at least a subset of the packets include a coding type indicator, wherein the coding type indicator for a given one of the packets is used in conjunction with a length indicator associated with that packet to determine a coding type for audio information in that packet.

18. An apparatus for communicating information in a packet-based communication system, the apparatus comprising:
a first device associated with a service specific convergence layer of a packet-based communication protocol, the first device being operative to receive packets associated with the service specific convergence layer, at least a subset of the packets each including a holdover indicator specifying whether an audio detector used for processing audio information associated with the packet is in a holdover mode; and
a second device coupled to the first device and associated with another layer of the packet-based communication protocol, the second device being operative to deliver the packets to the first device.

19. The apparatus of claim 18 wherein the first device comprises a Service Specific Convergence Sublayer (SSCS) receiver operative to utilize the holdover indicators from the subset of the packets to determine if a period of silence has begun in the information transmitted in the packets.

20. The apparatus of claim 19 wherein the SSCS receiver is further operative to direct the playback of comfort noise based on the value of a given one of the holdover indicators.

21. An apparatus for communicating information in a packet-based communication system, the apparatus comprising:
a first device associated with a service specific convergence layer of a packet-based communication protocol, the first device being operative to incorporate the information into packets associated with the service specific convergence layer, at least a subset of the packets each including a holdover indicator specifying whether an audio detector used for processing audio information associated with the packet is in a holdover mode; and
a second device coupled to the first device and associated with another layer of the packet-based communication protocol, the second device being operative to provide rate control based on values of the holdover indicators.

22. The apparatus of claim 21 wherein the second device comprises a Common Part Sublayer (CPS) transmitter which provides rate control by dropping at least one of the packets having a holdover indicator of a specified value if a maximum bandwidth of a transmission connection is exceeded.

* * * * *